United States Patent
Paramore et al.

(10) Patent No.: US 7,109,913 B1
(45) Date of Patent: Sep. 19, 2006

(54) AIRBORNE WEATHER RADAR SYSTEM AND RADAR DISPLAY

(75) Inventors: Steve Paramore, Cedar Rapids, IA (US); Daniel L. Woodell, Robins, IA (US); Sarah Barber, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 210 days.

(21) Appl. No.: 10/838,291

(22) Filed: May 4, 2004

(51) Int. Cl.
*G01S 13/95* (2006.01)

(52) U.S. Cl. .................... 342/26 B; 342/176; 342/179; 342/182; 342/183

(58) Field of Classification Search ............. 342/26 R, 342/26 A–26 D, 176, 179–183, 195, 197; 340/949, 953, 955; 702/3
See application file for complete search history.

(56) References Cited

U.S. PATENT DOCUMENTS

| | | | |
|---|---|---|---|
| 4,835,536 A | 5/1989 | Piesinger et al. | 342/26 |
| 4,940,987 A | 7/1990 | Frederick | 342/26 D |
| 5,049,886 A | 9/1991 | Seitz et al. | 342/26 B |
| 5,398,033 A * | 3/1995 | Michie | 342/26 B |
| 5,488,375 A * | 1/1996 | Michie | 342/26 B |
| 5,805,100 A | 9/1998 | Becker et al. | 342/26 |
| 5,907,568 A * | 5/1999 | Reitan, Jr. | 342/26 B |
| 6,043,756 A * | 3/2000 | Bateman et al. | 340/945 |
| 6,184,816 B1 * | 2/2001 | Zheng et al. | 342/26 R |
| 6,199,008 B1 * | 3/2001 | Aratow et al. | 701/120 |
| 6,201,494 B1 | 3/2001 | Kronfeld | 342/26 |
| 6,271,768 B1 * | 8/2001 | Frazier et al. | 340/961 |
| 6,424,288 B1 | 7/2002 | Woodell | 342/26 |
| 6,441,773 B1 | 8/2002 | Kelly et al. | 342/26 |
| 6,448,922 B1 | 9/2002 | Kelly | 342/26 |
| 6,501,392 B1 | 12/2002 | Gremmert et al. | 340/971 |
| 6,512,476 B1 | 1/2003 | Woodell | 342/26 |
| 6,549,161 B1 * | 4/2003 | Woodell | 342/26 R |
| 6,597,305 B1 | 7/2003 | Szeto et al. | 342/26 |
| 6,650,275 B1 * | 11/2003 | Kelly et al. | 342/26 R |
| 6,653,947 B1 | 11/2003 | Dwyer et al. | 340/970 |
| 6,667,710 B1 | 12/2003 | Cornell et al. | 342/26 |
| 6,670,892 B1 * | 12/2003 | Block | 340/963 |
| 6,683,541 B1 * | 1/2004 | Staggs et al. | 340/961 |
| 6,690,317 B1 | 2/2004 | Szeto et al. | 342/26 |
| 6,703,945 B1 * | 3/2004 | Kuntman et al. | 340/961 |
| 6,707,415 B1 | 3/2004 | Christianson | 342/26 |
| 6,720,906 B1 | 4/2004 | Szeto et al. | 342/26 |
| 2002/0039072 A1 * | 4/2002 | Gremmert et al. | 340/945 |

OTHER PUBLICATIONS

"In-flight weather trending information: optimal looping characteristics for animated NEXRAD images", Lemos, K.; Chamberlain, J. Digital Avionics Systems Conference, 2004. DASC 04. The 23rd vol. 1, Oct. 24-28 pp. 5D4-1 to 5D4-12.*

(Continued)

*Primary Examiner*—John B. Sotomayor
(74) *Attorney, Agent, or Firm*—Nathan O. Jensen; Kyle Eppele

(57) ABSTRACT

An airborne weather radar system that detects potentially hazardous weather conditions associated with storms and includes a radar display featuring visual indications of these conditions. The radar display includes a vertical situation display having iconal representations and symbolic icons indicative hazardous weather conditions and aviation hazards along the aircraft's flight path not otherwise immediately apparent or shown on standard weather radar displays. The system includes processes for detecting and predicting hazardous weather conditions such as overshooting thunderstorm tops and vaulted thunderstorm energy and serious hazards such as turbulence and hail.

22 Claims, 7 Drawing Sheets

OTHER PUBLICATIONS

"Radar synthetic vision system for adverse weather aircraft landing", Sadjadi, F.; Helgeson, M.; Radke, M.; Stein, G. Aerospace and Electronic Systems, IEEE Transactions on vol. 35, Issue 1, Jan. 1999 pp. 2-14.*

"Cockpit integration of uplinked weather radar imagery", Kelly, W.; Kronfeld, K.; Rand, T. Digital Avionics Systems Conferences, 2000. Proceedings. DASC. The 19th, 2000 pp. 3D4/1-3D4/6 vol. 1.*

U.S. Appl. No. 10/631,253 for "Adaptive Weather Radar Detection System and Method Used in Continental and Maritime Environments" by Woodell et al., filed Jul. 31, 2003,.

U.S. Appl. No. 10/631,316 for "Runway Obstacle Detection System and Method" by Woodell, filed Jul. 31, 2003.

U.S. Appl. No. 10/667,701 for "Enhanced Adaptive Weather Thresholds for Identification of Hazards System and Method" by Woodell et al., filed Sep. 22, 2003.

Patent Application for "Weather Radar Hazard Detection And Display System And Method" by S. Paramore and Daniel L. Woodell, being filed on an even date herewith.

* cited by examiner

AIRBORNE WEATHER RADAR SYSTEM AND RADAR DISPLAY

CROSS REFERENCE TO RELATED APPLICATIONS

The present application is related to co-filed application Ser. No. 10/838,290 and filed on an even date herewith entitled "WEATHER RADAR HAZARD DETECTION AND DISPLAY SYSTEM AND METHOD" invented by Steve Paramore and Daniel L. Woodell. The co-filed application is incorporated by reference herein in its entirety.

FIELD OF THE INVENTION

The present invention relates to airborne weather radar systems and more particularly to airborne radar systems that can detect and provide warnings about hazardous weather and flight conditions.

BACKGROUND OF THE INVENTION

Airborne weather radar systems are used to detect the presence of storms and turbulent weather. This is important since weather is a cause or contributing factor in a large number of aircraft accidents. Weather forecasts are useful but airborne weather radar provides invaluable real time input as to local conditions ahead and in the immediate vicinity of the aircraft. Accordingly, weather radar serves as the main focus of the pilot's awareness of weather conditions that may affect the aircraft. However, radar reflectivity at the frequencies employed in weather radar systems is primarily a function of the amount of atmospheric moisture. Modern weather radar is first and foremost a gauge of rainfall providing an excellent graphical depiction of precipitation conditions relative to the aircraft's position. On most weather radar displays different colors are used to represent different radar return signal levels and correspondingly different amounts of moisture detected in the atmosphere. Typically, the color black is used to represent very little or no rainfall; green is used to represent weak rainfall; yellow is used to represent moderate rainfall; and red is used to represent strong rainfall. It's up to the pilot to then interpret the display and to infer the presence of hazardous flight conditions from the image features depicted on the display. It takes training and experience to do this effectively and can represent a substantial workload to pilots who are often busy performing other essential tasks. Consequently, weather radar may not be used to its maximum potential and hazardous conditions may sometimes be missed.

Thunderstorms are a major hazard to aircraft and an understanding some of their characteristics is important to pilots in interpreting weather radar. Thunderstorms are composed of three vertical parts. The bottom portion, below the freezing level, is composed mostly of rain that reflects weather radar signals very well and serves as the most reflective portion of the storm ("bright band"). The middle portion occurs above the freezing level and up to the altitude level or tropopause where the ambient air temperature drops below –40 degrees Celsius. This section of the storm is composed of a combination of ice crystals having low reflectivity and super cooled water providing moderate reflectivity. This middle portion shows up well on weather radar but its radar reflectivity diminishes with increasing altitude up to the –40 degree C. level often referred to as the radar or wet top of the storm. Severe thunderstorms can often be distinguished from more benign storms by vertically scanning the storm and determining the amount of vertical development in the storm above freezing level and the amount of the storm above the tropopause level. Above the –40 degree C. level up to its actual or visible top, a storm is composed entirely of ice crystals that reflect very little radar energy. However this top section above the radar top may be the site of serious turbulence and comprise an area hazardous to aircraft.

Given the right conditions with large amounts of warm and humid air rising from the ground thunderstorms can grow with surprising speed and ascend in altitude as rapidly as 6000 ft. per minute. As warm and humid air is caught in strong updrafts and converted to ice crystals and supercooled water it may rise up well above the freezing level. Large amounts of moisture can be trapped and held aloft high in a thunderstorm cell forming an area of dangerous potential energy for creating hazardous weather. This phenomenon is referred to as thunderstorm vaulting. During such events, limited precipitation occurs in the bottom portion of the storm as few downdrafts exist and the true extent of the storm may be misjudged unless the middle portion of the storm is scanned and the developing nature of the threat recognized.

U.S. Pat. No. 5,049,886 to Seitz et al describes a weather radar system in which the weather data is converted into polar coordinates and is rotated and translated on the display screen in accordance with turning maneuvers executed by the aircraft. This patent also describes weather radar systems having combined displays of PPI and RHI data.

U.S. Pat. No. 4,940,987 to Frederick describes a radar system featuring an automatic horizontal and vertical scanning radar for displaying weather conditions in combined plan view and vertical view images. The vertical view may comprise a vertical front view display or a vertical side view display having altitude indicia so that the pilot can perceive heights and intensities of storm cells and select the best route through adverse weather conditions.

U.S. Pat. No. 6,650,275 to Kelly et al describes a weather radar system which processes radar images to identify features such as squall lines, hooks and steep reflection gradients that are potentially indicative of hazardous conditions. Notifications may then be provided on the radar screen such as textual information or visual highlighting that warns the pilot about the hazardous conditions.

SUMMARY OF THE INVENTION

The present invention comprises an airborne weather radar system that detects and provides visual warnings of hazardous weather conditions due to thunderstorms in the vicinity of the aircraft. The weather radar system includes a radar image display having plan position view representing radar signal reflections resulting from horizontal scans of a weather radar beam forward of an aircraft along its flight path and a vertical profile type view associated with the plan position view representing radar signal reflections resulting from directed vertical scans of a weather radar beam forward of the aircraft. The vertical situation display or vertical profile view includes iconal representations and symbolic icons representing potentially hazardous weather conditions which may that pose a serious hazard to aircraft navigation. The iconal representations are derived from the radar reflection data but are also based on data for key altitude levels such as the freezing altitude level and tropopause level affecting the character of the weather within storms. The iconal representations include enhancements of radar image corresponding to potentially hazardous conditions such as overshooting thunderstorm tops and extensive vertical storm development above freezing level. The symbolic icons are similarly based on radar reflection data and key altitude levels but have a fixed geometric form intended to convey a warning to the aircraft pilot and information about the nature of the hazard. The symbolic icon itself may include textual material identifying and characterizing the hazard. Symbolic icons provide alerts about serious flight hazards such as thunderstorms with large overshooting tops, substantial amounts of vaulted energy, and conditions associated with severe hail or turbulence. As an alternative the vertical situation display may be rendered as a depiction of weather hazards according to threat level calculated and forecast as a function of weather and storm cell prediction algorithms operating on the raw radar return data to develop advanced displays showing true threat elements.

The hazardous weather conditions are identified using radar reflection data in combination with atmospheric data for determining weather and hazard conditions. A weather radar beam is employed to generate radar reflections from a thunderstorm. In the preferred embodiment the ambient temperature outside the aircraft and aircraft altitude are measured with onboard sensors. The ambient temperature and other atmospheric data are then used to calculate key parameters such as the freezing altitude and tropopause levels. The radar reflections are then analyzed in view of these parameters and iconal representations generated to enhance the radar image and accentuate potentially hazardous conditions and symbolic icons generated when the hazardous weather conditions exceed severity related thresholds for these phenomena and seriously hazardous flight conditions exist. The radar reflection data may also be analyzed with respect to its spectral characteristics to detect turbulence or pattern recognition techniques may be used to detect other hazardous weather conditions such as hail by identifying unusual signal reflection and polarisation patterns. Symbolic icons are preferably presented on the vertical profile view but may also be presented on both radar display views.

It is an object of the present invention to provide an improved airborne weather system having a radar display showing and accentuating hazardous weather conditions associated with thunderstorms.

It is another object of the invention to provide a weather radar display having a separate vertical profile view that may advantageously show potentially hazardous weather conditions as iconal representations in alignment with the locations of such conditions and display alert icons providing flight hazard warnings when conditions become sufficiently dangerous.

It is a further object of the present invention to detect hazardous flight conditions based on the use of radar reflections and weather parameters derived from atmospheric data which provide information about the radar reflectivity of weather phenomenon at different altitudes within storm cells.

It is a yet another object of the present invention to provide a weather radar system and display that is able to show symbolic icons corresponding to hazardous weather conditions such as overshooting thunderstorm tops, vaulted thunderstorm energy and turbulence and hail as may be indicated by a combination of radar reflection and weather parameter data.

Finally, it is a yet further object of the present invention to provide a weather radar system and display for depicting aviation threat levels associated with weather hazards including predicted or projected weather hazards arising with respect to developing storm cells.

DETAILED DESCRIPTION

Figure 1:
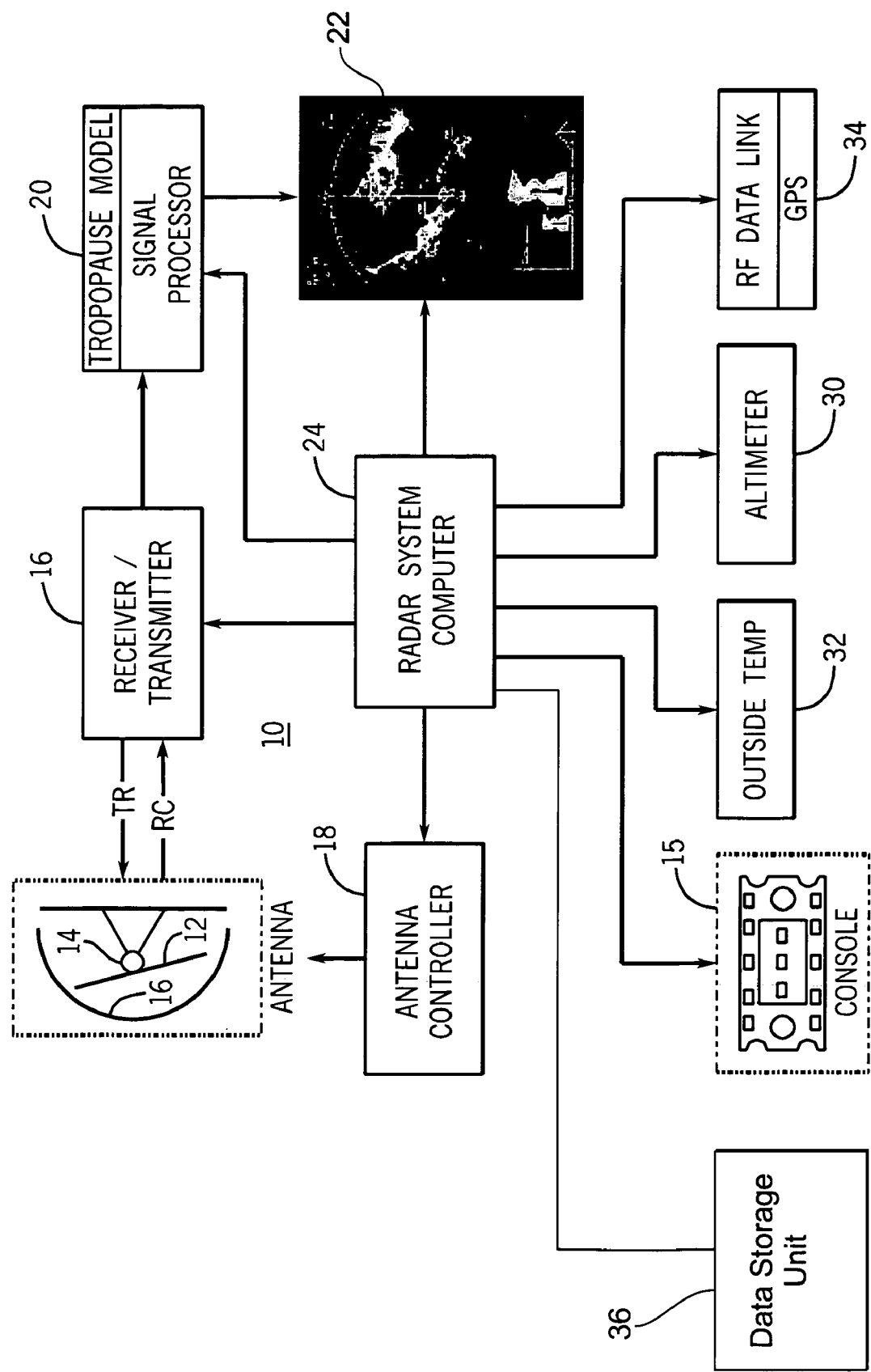
FIG. 1 provides a block diagram of the hardware components comprising the weather radar system of the present invention.

Referring now to FIG. 1 a block diagram of a weather radar system 10 is shown. The weather radar system 10 includes an antenna 12 mounted on a gimbel 14 within a radome 16. The gimbal 14 enables the antenna 12 to scan throughout a range of azimuth and elevation or tilt angles when in operation at the direction of the antenna controller 18. The system 10 also includes a transmitter/receiver 16 for generating radar signals for supply to the antenna 12 and for amplifying radar signal reflections received from the antenna 12. A signal processor 20 is used for processing the received radar signals into weather information and images and a display screen 22 is used for displaying the images and weather information. The signal processor 20 also preferably includes weather forecasting and storm cell growth and decay prediction algorithms. A microprocessor system or computer 24 controls the weather radar system 10 including the antenna controller 18. Operator input to the computer 24 from the aircraft pilot is provided through the input console 15. The controller 18 allows the system 10 to have the antenna 12 perform horizontal or vertical scans for providing plan position or vertical image data. The range and sensitivity of the weather radar system 10 may be adjusted by various methods such as changing the transmitter power or pulse width or varying the gain of the receiver. An altimeter 30 is provided to detect the aircraft's current altitude and a thermometer 32 is employed to provide measurements of the ambient temperature outside the aircraft. An RF data link 34 is used to up-link weather information from ground communication stations that may have data from weather satellites, ground based Doppler radar, standard terrestrial weather condition sensors and from other aircraft. The RF data link 34 may also include a GPS (Global Positioning System) receiver unit for accurately determining aircraft position. A data storage unit 36 serves to store and provide atmospheric reference data and the like. The altimeter 30, thermometer 32, data link 34 and storage unit communicate data to the signal processor 20 through the computer 24 that the processor 20 may use in generating radar and weather display images. The processor 20 may also include a tropopause model for accurately predicting tropopause levels based on latitude and longitude, time of year, time of day, weather patterns, jet stream effects and aircraft-based observations such as current altitude and temperature.

Weather radar systems transmit radar signals in the form of short pulses of microwave energy, typically in the X-band, from the receiver/transmitter 16 that are radiated outward by the antenna 12. Energy from these pulses is in turn reflected from water droplets or other forms of precipitation within storms back to the antenna 12. The receiver/transmitter 16 receives the reflected pulses and the signal processor 20 processes the received pulse data to derive weather information and radar images. Plan position or vertical view radar images of storms and related aviation hazard information are displayed on the display screen 22.

The 0 degree C. isotherm or freezing altitude level and the −40 degree C. altitude level or tropopause height can be estimated based on the aircraft's current altitude, as measured by the altimeter 30, the outside temperature, as measured by the thermometer 32, and certain standard atmosphere data stored in data storage init 36. Once an outside temperature and corresponding altitude are known the freezing altitude and −40 degree C. level are calculated based on the fact temperatures fall about 2 degrees C. per thousand feet of elevation. Atmospheric reference data from the storage unit 36 can be used to calculate these figures with greater accuracy. Alternatively, these altitude levels may be determined based on data provided by the National Weather Service or a similar source accessed and up-linked by means of the RF data link 34. In such cases freezing altitude and −40 degree C. level data may be provided for the current aircraft position and also at other ranges along the projected flight path of the aircraft. Having this data at different ranges can yield better freezing level estimates with respect to more distant storms. In a third method in-situ measurements of the atmospheric temperature may by made with the thermometer 32 at varying altitudes during the ascent of the aircraft in order to identify the freezing level in accordance with the altitude sensed by the altimeter 30. Further, The freezing altitude may be estimated through use of a combination of the above techniques. The freezing altitude, the acquired ambient temperature and aircraft altitude data are then transferred to the signal processor 20 for use in analyzing radar and weather data.

Figure 2:
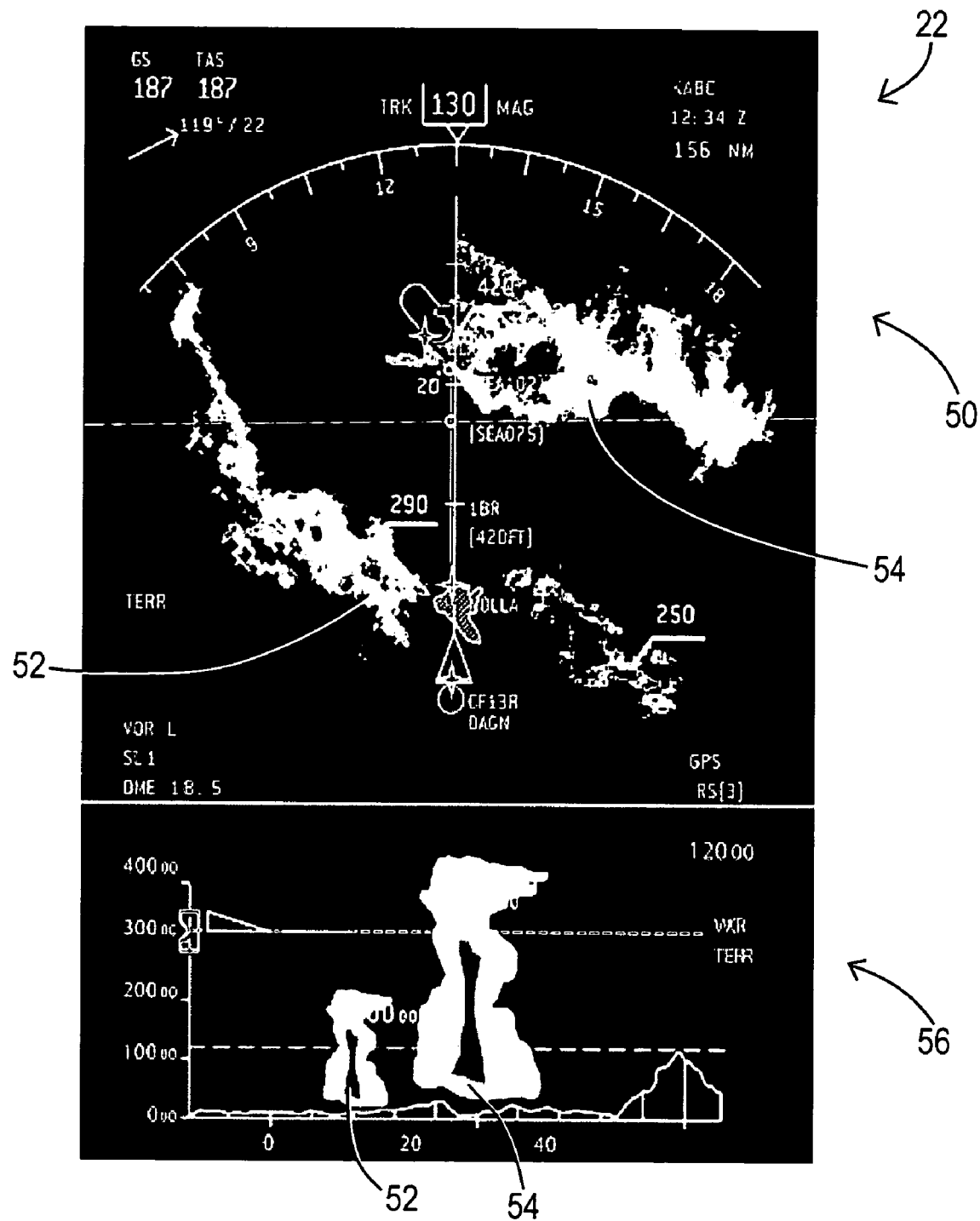
FIG. 2 provides a diagram of a weather radar display screen having plan position (PPI) view and vertical profile view radar images in accordance with the present invention.

Referring now to FIG. 2, the plan position view 50 shows the result of radar scans (across a range of azimuth angles) according to green, yellow and red color-codes forward of the aircraft. In this case a small storm 52 is shown immediately ahead and a large storm cell 54 is shown about 30 nautical miles ahead and centered slightly to the right of the aircraft's flight path. The vertical scan view 56 shows the results of radar scans (across a range of tilt angles) forward of the aircraft. Again, a small storm 52 is shown immediately ahead and a large storm cell 54 is shown about 30 nautical miles ahead. However, the vertical view 56 is enhanced in accordance with the present invention and provides important information about the vertical development and extent of the storm 54.

Figure 3A:
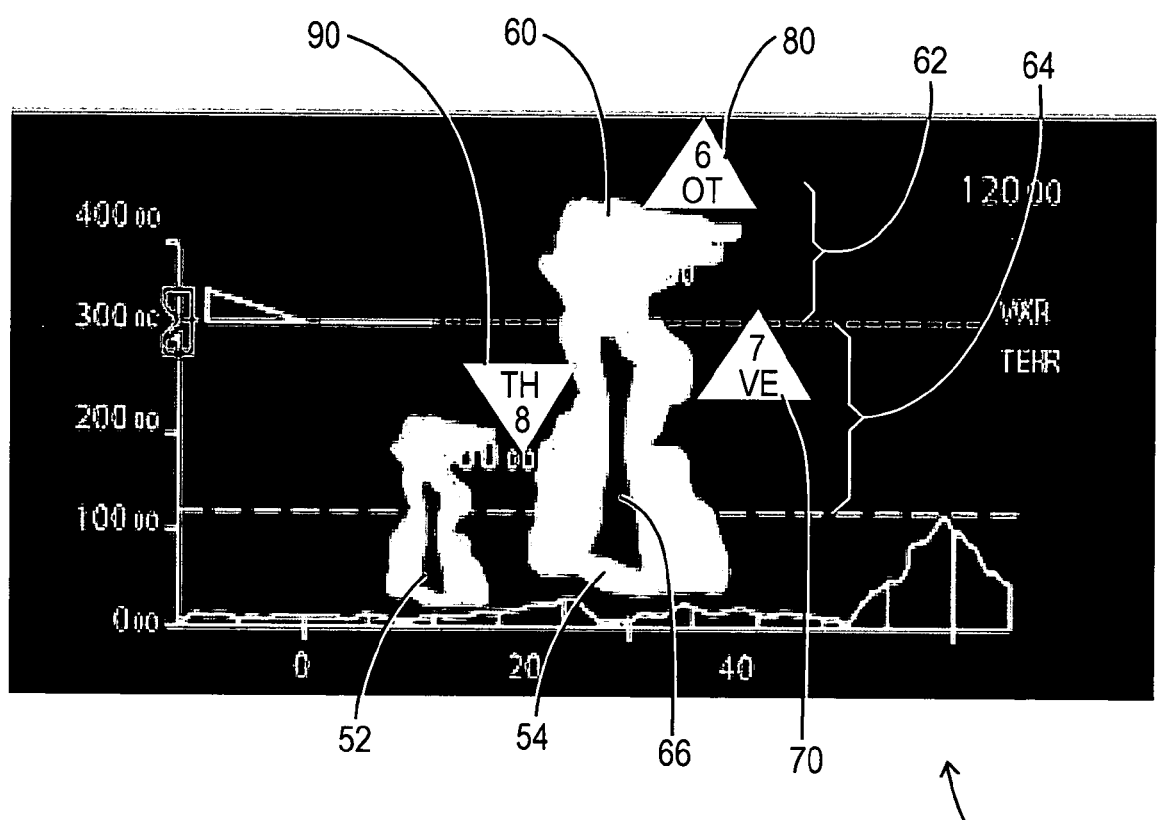
FIG. 3A provides a diagram of a vertical situation display radar image for a weather radar display screen illustrating the use of iconal representations and alert icons in accordance with the present invention.

Referring now to FIG. 3A, the vertical situation display or vertical scan view 56 shows an overshooting top 60 extending above the −40 degree C. altitude level which is a strong indicator of significant updrafts that have forced the thunderstorm above the level of the tropopause and of turbulence that would make over flight hazardous. The radar image for the top formation 62 of the storm 54 is enhanced by having the processor 20 substantially increase its image intensity to provide an iconal representation of the top. In effect the gain applied to the signal data from the top region of the storm cell above the tropopause is increased by, for example, about +16 dB or one and one half screen display color levels so that the amount of glaciated moisture in the top formation can be more clearly seen. FIG. 3 also shows the vertical development of the storm above freezing altitude level. Significant vertical development of a storm extending well above freezing level may be indicative of major updrafts, downdrafts and turbulence that can affect aircraft especially during take off and approach. The radar image in the middle formation 64 of the storm 54 is enhanced by having the processor 20 moderately increase its image intensity. In effect the gain applied to the signal data from the middle region 64 of the storm cell above the freezing level but below the tropopause level is increased by, for example, about +10 dB or one screen display color level so that the ice crystals and supercooled moisture in the middle formation can be more clearly seen. The resulting radar image of the storm cell 54 provides enhancements to the visual representation of the storm more clearly defining the potential hazards that it may pose.

Figure 3B:
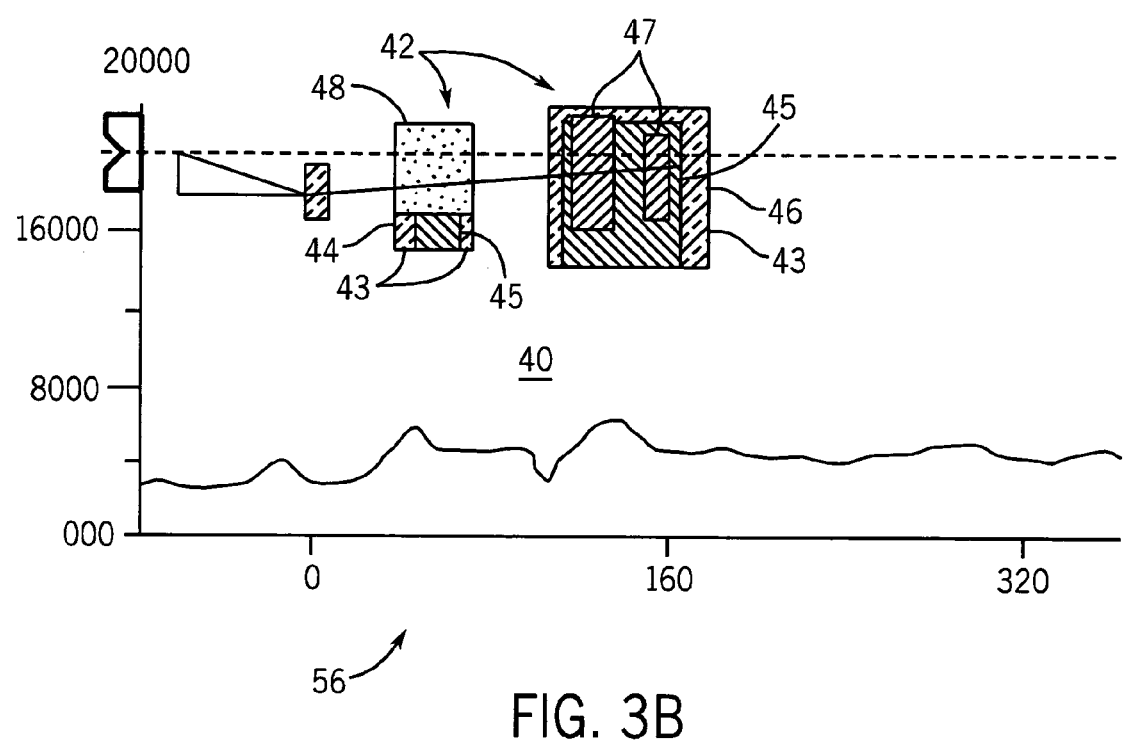
FIG. 3B provides a diagram of a vertical situation display radar image for a weather radar display illustrating the weather hazard blocks representing aviation threat levels.

Referring now to FIG. 3B, the vertical situation display or vertical scan view 56 shows a vertical weather hazard depiction 40 which is composed of low resolution nested or additive blocks 42, indicating the level of weather hazard at a particular range and altitude forward of the aircraft along its projected flight path. The blocks 42 are displayed using saturated colors (green, yellow, red, and magenta) to indicate a progression in the intensity of the weather hazard and represent information from the radar return data processed in accordance with meteorlogical algorithms at the processor 20 to correspond to realistic weather hazard information reflecting true levels of threat. In this case the blocks indicate two storm cells 44 and 46 directly ahead of the aircraft representing potential hazards to navigation. Blocks 43 show a low level of threat. Blocks 45 show a moderate level of threat. Blocks 47 show a high level of threat. Other colors such as magenta may be used to form further blocks indicative of very serious weather hazards such as areas of severe turbulence and hail. The blocks 42 do not simply represent radar reflection data indicative of amounts of precipitation but rather correspond to fully iconal representations of aviation hazards. For example, the intensity of all returns from glaciated clouds and maritime clouds is enhanced to correct for air temperature and for low oceanic cloud reflectivity. Further, these blocks also represent predicted threat levels (including turbulence) as generated by specialized algorithms adapted for forecasting the intensity, growth and decay of storm cells running on the processor 20. In particular, in this case the depiction 40 is indicating a prediction for vertical storm cell growth from below the aircraft's altitude into the aircraft's flight path, which is shown as a hatched block 48 on the display 56. The blocks 42 are displayed at a low resolution level on account of their of the their predictive character and as an indication of their inherently indefinite and probabilistic nature. This weather hazards display 56 provides a tool for in-flight planning to avoid weather hazards and provide a safer and smoother ride for passengers.

During the building phase of a thunderstorm energy can be trapped at higher than expected levels by very strong updrafts. An area of high potential energy is formed as moisture is carried high up into the storm cell while downdrafts are all but eliminated and little precipitation occurs in the bottom of the cloud or bright band region (high radar reflectivity). This potential or vaulted thunderstorm energy can cause sudden wind shears to occur that result in extreme turbulence. This may lead to serious hazards that can unexpectedly develop during take off and landing as pilots fly through lower portions of storms that may not have previously looked threatening. Storm cell 54 fits these criteria with a comparatively large and intense area 66 of radar reflectivity showing up at middle and upper altitudes in the storm cell 54.

Figure 4A:
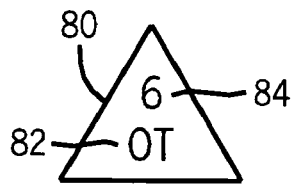
FIGS. 4A, 4B and 4C provide examples of alert icons used to provide radar screen based hazard warnings in accordance with the present invention.
Figure 4C:
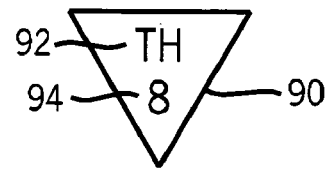
Figure 4B:
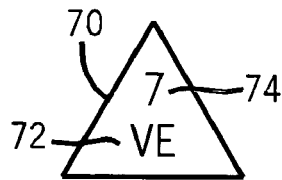

In response to these conditions a vaulted energy alert icon 70 is displayed adjacent to the area 66 in the cell 54. As shown more clearly in FIG. 4B, the alert icon 70 has fixed triangular shape and contains an acronym suggestive of the alert type, in this case VE for Vaulted Energy, and may be termed a symbolic icon since it is not part of the radar image itself. The icon 70 also includes a number 74 indicative of the current intensity of the phenomenon and points either upward or downward as an indication of whether the effect is increasing or decreasing over time.

Likewise, as also shown in FIG. 3A, an overshooting top alert icon 80 is displayed adjacent to the top of the storm cell 54 to show that the overshooting top 60 has become sufficiently large and intense to constitute a serious hazard to aircraft navigation. In a manner similar to the alert icon 70 and as more clearly shown in FIG. 4A, the alert icon 80 has a triangular shape and contains an acronym 82 suggestive of the alert type, in this case OT for Overshooting Top, and may be termed a symbolic icon since it is not part of the radar image itself. The icon 80 also includes a number 84 indicative of the intensity of the phenomenon and points either upward or downward as an indication of whether the effect in increasing or decreasing over time.

Serious updrafts and turbulence are dangerous by themselves but are also closely associated with hail and their presence can provide an indication of the probability of hail occurring in conjunction with a storm. Turbulence and especially hail can constitute severe hazards to aircraft navigation. Turbulence may be detected on the basis of the spectral width associated with the radar return signals (the radar "echoes") received back by the radar system 10 and a probability for hail may be inferred from these measurements. Spectral width may be calculated by the signal processor 20 based on the extent of the inter-pulse variation in amplitude across a series the radar returns for the same range with the transmit frequency being precisely controlled. The spectral width correlates with the extent of the range of velocities of the precipitation (e.g. raindrops) off of which the signals are reflected. Additionally, hail may be detected by using polarisation diversity radar to determine polarimetric variables such as the reflectivity factors at horizontal and vertical polarization and differential reflectivity or specific differential phase. These variables may then be used in predictive algorithms that detect mathematical divergencies which are a function of the presence of hail. For example, the reflectivity factor at horizontal polarization may then be compared to functions of differential reflectivity to detect the areas having a high probability for hail.

As further shown in FIG. 3A, a turbulence and hail alert icon 90 is displayed adjacent to the left side of the storm cell 54 to show that conditions have been detected indicative of serious turbulence and favorable to the formation of hail (or that the existence of a dangerous hail shaft is possible). In a manner similar to the alert icon 70 and as more clearly shown in FIG. 4C, the alert icon 90 has fixed triangular shape and contains an acronym 92 suggestive of the alert type, in this case TH for Turbulence-Hail, and may be termed a symbolic icon since it is not part of the radar image itself. The icon 90 also includes a number 94 indicative of the probability of hail and points either upward or downward as an indication of whether these effects are increasing or decreasing over time.

Figure 5:
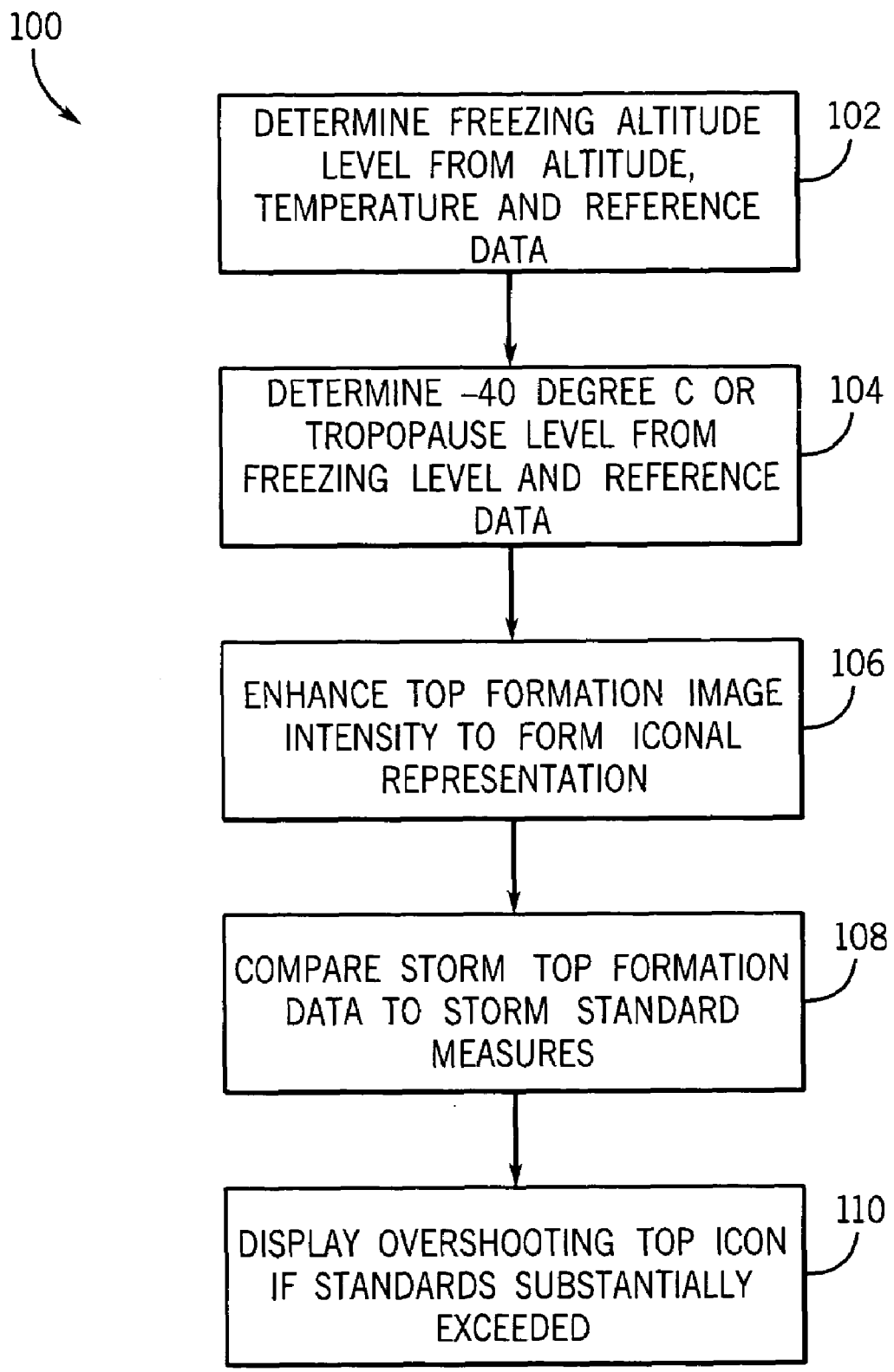
FIG. 5 provides a flowchart of the process for detecting and displaying overshooting tops in storms and providing alerts when such conditions present serious aviation hazards in accordance with the present invention.

Referring now to FIG. 5, the process 100 for detecting overshooting tops includes step 102 in which the freezing altitude level is determined based on ambient temperature outside the aircraft, the aircraft's altitude and atmospheric reference data from databases on board the aircraft or data from terrestrial sources supplied by an RF link. The atmospheric data reflect corrections for seasonal factors, surrounding geography, longitude and latitude, time of day and observed variations form normal patterns. The −40 degree C. altitude or tropopause level is then calculated in step 104 based on the freezing level and similar atmospheric reference data applicable to calculating the tropopause level. Thereafter, in step 106 the image intensity of the top formation (e.g. 62 in FIG. 3A) of the storm cell above the tropopause level is enhanced on the radar screen display. In step 108 the intensity and geographic extent of the top formation is analyzed and compared to standard or average measures for storms. If the formation substantially exceeds such standards for thunderstorms an overshooting top alert icon (e.g. 80 in FIG. 3A) is displayed in direct proximity to the top of the storm cell in step 110.

Figure 6:
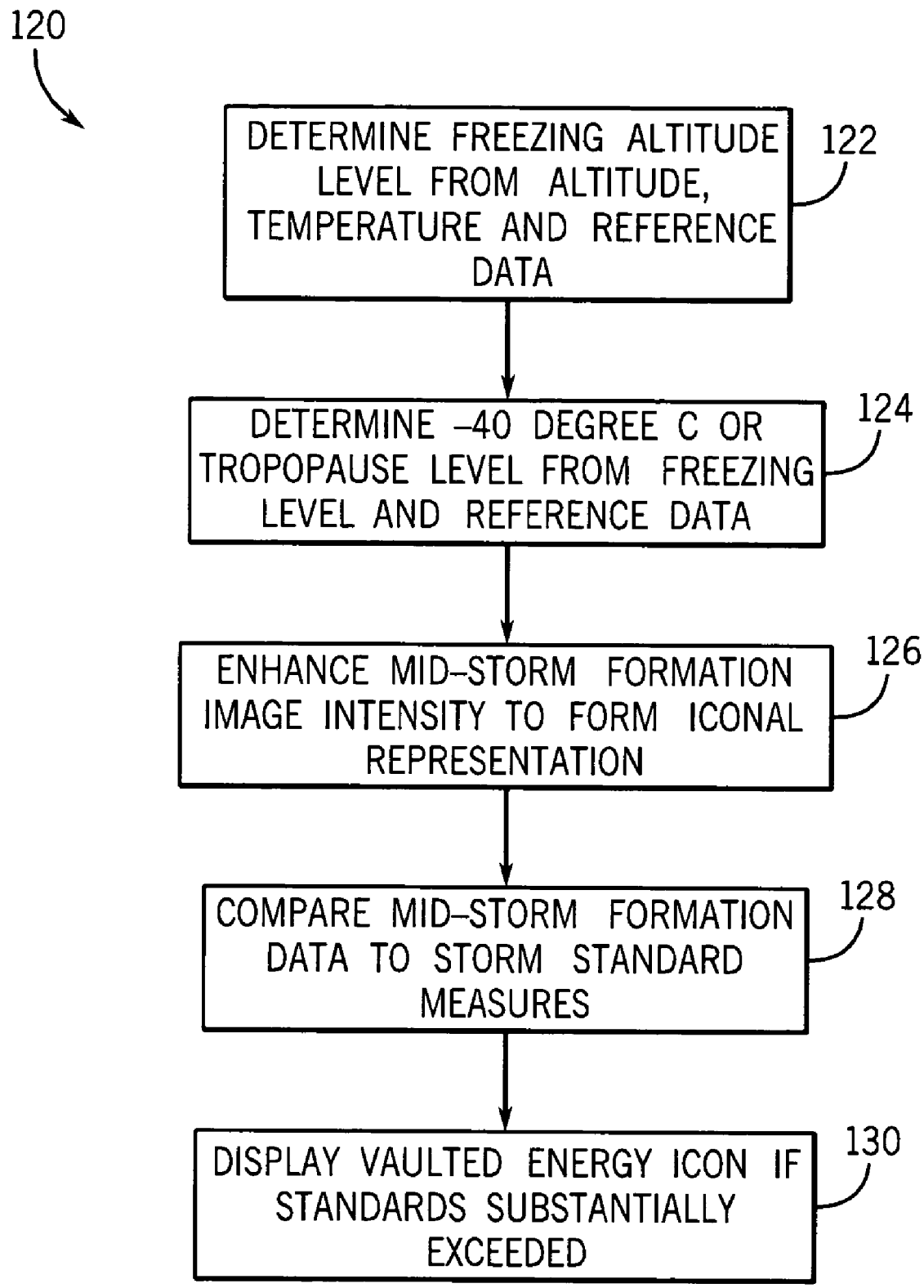
FIG. 6 provides a flowchart of the process for detecting displaying vertical storm development above freezing level and vaulted thunderstorm energy in storms and providing alerts when such conditions present serious aviation hazards in accordance with the present invention.

Referring now to FIG. 6, the process 120 for detecting vertical development above freezing level and vaulted thunderstorm energy includes step 122 in which the freezing altitude level is determined based on ambient temperature outside the aircraft, the aircrafts altitude and atmospheric reference data from databases on board the aircraft or from terrestrial sources supplied by an RF link. The atmospheric data reflect corrections for seasonal factors, surrounding geography, longitude and latitude, time of day and observed variations from normal patterns. The −40 degree C. altitude or tropopause level is then calculated in step 124 based on the freezing level and similar atmospheric reference data applicable to calculating tropopause levels in accordance with the tropopause model resident in the processor 20. Thereafter, in step 126 the image intensity of the middle formation (e.g. 66 in FIG. 3) of the storm cell above the freezing level and below the tropopause level is enhanced on the radar screen display. In step 128 the intensity and geographic extent of the middle formation is analyzed and compared with the other parts of the storm and with standard or average measures for storms. If the formation substantially exceeds the average standards for thunderstorms a vaulted energy alert icon (e.g. 70 in FIG. 3) is displayed in direct proximity to the top of the storm cell in step 130.

Figure 7:
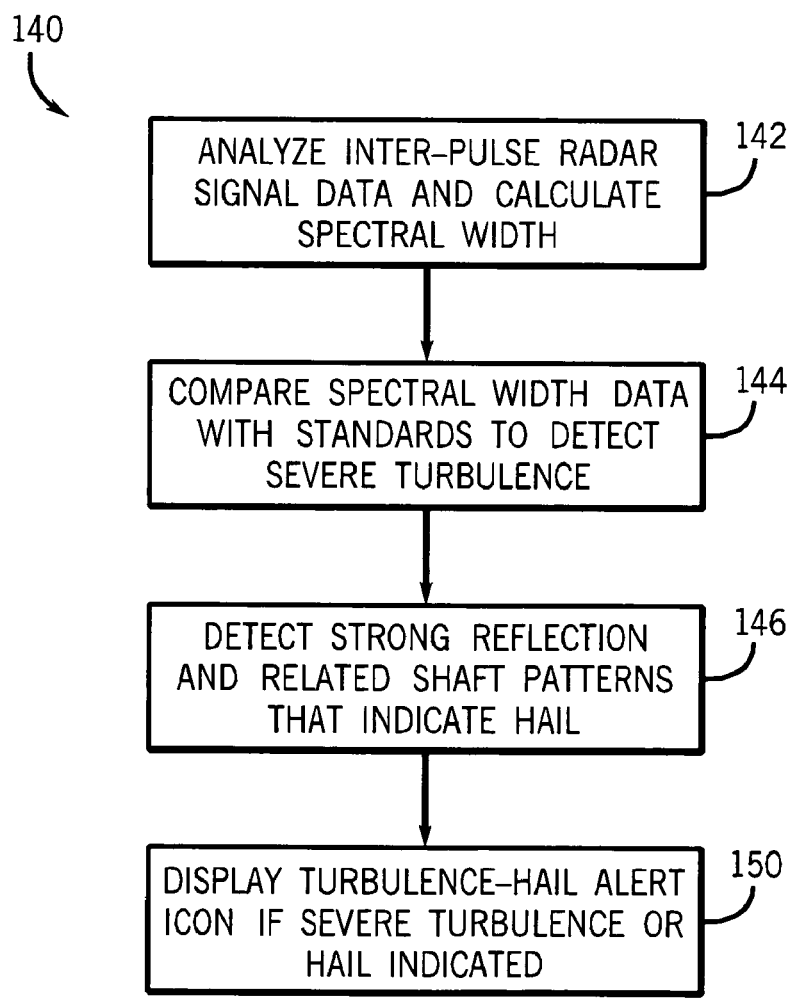
FIG. 7 provides a flowchart for detecting turbulence and hail in storms and providing alerts when such conditions present serious aviation hazards in accordance with the present invention.

Referring now to FIG. 7, the process 140 for detecting turbulence and hail includes step 142 in which inter-pulse amplitude variations data is collected and analyzed by the signal processor 20 to calculate the spectral width of the radar return signals from areas in and around storm cells. In step 144 the spectral width figures are compared with standard measures for storms to provide a gauge of the levels of turbulence detected. In step 146 the radar data are searched for strong radar signal returns occurring in close proximity to columnar shaft patterns beyond the range of typical radar data. If the standard measures for spectral width or measures for signal returns from columnar type formations are substantially exceeded a turbulence-hail alert icon 90 (e.g. in FIG. 3) is displayed adjacent to the part of the storm cell at which such conditions are detected in step 150.

Although the invention has been described with reference to certain embodiments for which many implementation details have been described, it should be recognized that there are other embodiments within the spirit and scope of the claims and the invention is not intended to be limited to the details described with respect to the embodiments disclosed. For example, in accordance with the current invention, many good alternatives exist with respect to the shapes that may be used for the alert icons and for the types of information that may be displayed in conjunction with them.

What is claimed is:

1. An airborne weather radar system, comprising:
   a display screen having a vertical profile view representing a radar reflection image resulting from a vertical scan of a weather radar beam through an area forward of an aircraft;
   an altimeter for measuring altitude of the aircraft;
   a thermometer for measuring temperature outside the aircraft;
   a radar system computer for calculating a freezing altitude level and a tropopause altitude level based on said altitude and temperature; and
   the display screen having an iconal representation of said vertical profile view of a potentially hazardous weather condition associated with a storm that is characterized by an area of enhanced radar image intensity positioned in alignment with the position of said weather condition as a function of said freezing and tropopause altitude levels.

2. The weather radar system of claim 1, in which:
   said hazardous weather condition comprises an overshooting thunderstorm top projecting above the tropopause altitude level.

3. The weather radar system of claim 1, in which:
   said hazardous weather condition comprises vertical thunderstorm development above the freezing altitude and below the tropopause altitude level.

4. The weather radar system of claim 1, further comprising:
   a symbolic icon overlaying part of the radar reflection image providing an alert that an overshooting thunderstorm top presents a serious hazard to aircraft navigation.

5. The weather radar system of claim 1, further comprising:
   a symbolic icon overlaying part of the radar reflection image providing an alert that vertical thunderstorm development presents a serious hazard to aircraft navigation.

6. The weather radar system of claim 1, further comprising:
   a symbolic icon overlaying part of the radar reflection image providing an alert that turbulence and hail may present a serious hazard to aircraft navigation.

7. The weather radar system of claim 1, in which:
   said hazardous weather condition comprises vertical thunderstorm development above the freezing altitude and below the tropopause altitude level and vertical thunderstorm development above the freezing altitude and below the tropopause altitude level.

8. An airborne weather radar system, comprising:
   a display screen having a vertical profile view representing a radar reflection image resulting from a vertical scan of a weather radar beam through a storm in front of an aircraft;
   an altimeter for measuring altitude of the aircraft:
   a thermometer for measuring temperature outside the aircraft;
   a radar system computer for calculating a freezing altitude level and a tropopause altitude level based on said altitude and temperature; and
   the display screen having an iconal representation on said vertical profile view of a potentially hazardous weather condition associated with the storm that is characterized by an area of enhanced radar image intensity positioned in alignment with said hazardous weather condition and a symbolic icon overlaying part of the radar reflection image providing an alert that the hazardous weather condition presents a serious hazard to aircraft navigation.

9. The weather radar system of claim 8, in which:
   said symbolic icon includes a textual indication of the nature and intensity of the hazardous weather condition it represents.

10. The weather radar system of claim 8, in which:
    said symbolic icon represents an overshooting thunderstorm top.

11. The weather radar system of claim 8, in which:
    said symbolic icon represents vaulted thunderstorm energy.

12. The weather radar system of claim 8, in which:
    said symbolic icon represents turbulence and hail.

13. The weather radar system of claim 8, in which:
    said iconal representation comprises a function of said freezing altitude level and tropopause altitude level.

14. A process for use in conjunction with an airborne weather radar system for identifying and providing indications of hazardous weather flight conditions associated with a storm in the vicinity of a flight path of said aircraft, comprising the steps of:
    scanning said storm with a weather radar to generate radar reflections from said storm;
    displaying on a vertical profile view a radar reflection image of said storm;
    ascertaining an altitude and temperature outside the aircraft with onboard sensors;
    calculating a freezing altitude level and a tropopause altitude level in said storm based on said altitude and temperature;
    analyzing said radar reflections as a function of said freezing altitude level and tropopause altitude level; and
    displaying an iconal representation on said vertical profile view of a potentially hazardous weather condition associated with the storm that is characterized by an area of enhanced radar image intensity positioned in alignment with the position of said hazardous weather condition as a function of said freezing and tropopause altitude levels.

15. The process of claim 14, further including the step of:
    accessing a database of atmospheric reference data including geographic, time of day and time of year information on tropospheric height, and wherein:

said freezing altitude level and tropopause altitude level are calculated based on said atmospheric reference data.

16. The process of claim 14, wherein:

said hazardous weather condition comprises an overshooting thunderstorm top projecting above the tropopause altitude level.

17. The process of claim 14, wherein:

said hazardous weather condition comprises vertical thunderstorm development above the freezing altitude and below the tropopause altitude level.

18. The process of claim 14, further including the step of:

displaying a symbolic icon overlaying part of the radar reflection image providing an alert that the hazardous weather condition presents a serious hazard to aircraft navigation.

19. The process of claim 18, wherein:

said symbolic icon represent an overshooting thunderstorm top.

20. The process of claim 18, wherein:

said symbolic icon represents vaulted thunderstorm energy.

21. The process of claim 18, wherein:

said symbolic icon represents turbulence and hail.

22. The process of claim 18, wherein:

said symbolic icon includes a textual indication of the nature and intensity of the hazardous weather condition it represent.

* * * * *